(12) United States Patent
Morita

(10) Patent No.: US 8,780,404 B2
(45) Date of Patent: Jul. 15, 2014

(54) INFORMATION PROCESSING APPARATUS, METHOD FOR CONTROLLING SAME, AND STORAGE MEDIUM ON WHICH COMPUTER PROGRAM HAS BEEN RECORDED

(75) Inventor: Keisuke Morita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 13/412,752

(22) Filed: Mar. 6, 2012

(65) Prior Publication Data

US 2012/0229860 A1 Sep. 13, 2012

(30) Foreign Application Priority Data

Mar. 9, 2011 (JP) .................................. 2011-051626

(51) Int. Cl.
*G06F 15/00* (2006.01)
(52) U.S. Cl.
USPC ........................................................ 358/1.18
(58) Field of Classification Search
USPC ........................................................ 358/1.18
See application file for complete search history.

(56) References Cited

U.S. PATENT DOCUMENTS

2007/0223013 A1* 9/2007 Mizutani ......................... 358/1.2

FOREIGN PATENT DOCUMENTS

JP 2007-150698 A 6/2007

* cited by examiner

*Primary Examiner* — Saeid Ebrahimi Dehkordy
(74) *Attorney, Agent, or Firm* — Carter, DeLuca, Farrell & Schmidt, LLP

(57) ABSTRACT

An information processing apparatus includes a print appearance acquisition unit configured to acquire print appearance information including information for integration printing; a group generation unit configured to generate one or a plurality of groups by grouping the plurality of objects; a page number calculation unit configured to calculate the number of pages targeted for reduction for reducing the print sheets without producing any blank page area on the print sheets, when the integration printing is performed, on the basis of the number of pages of the plurality of pages to be assigned on each of the print sheets by the integration printing and the number of pages of the document data; and a page reduction unit configured to reduce the total number of pages by moving the groups on the basis of the print appearance information and the number of pages targeted for reduction.

9 Claims, 15 Drawing Sheets

FIG. 3A
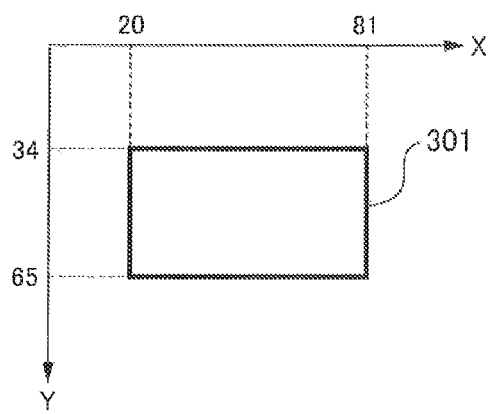
FIG. 3B
| 302 |
|---|
| OBJECT ID: 001 |
| OBJECT TYPE: GRAPHIC |
| UPPER LEFT COORDINATE: (20,34) |
| LOWER RIGHT COORDINATE: (81,65) |
| UNIQUE OBJECT INFORMATION |
FIG. 4A
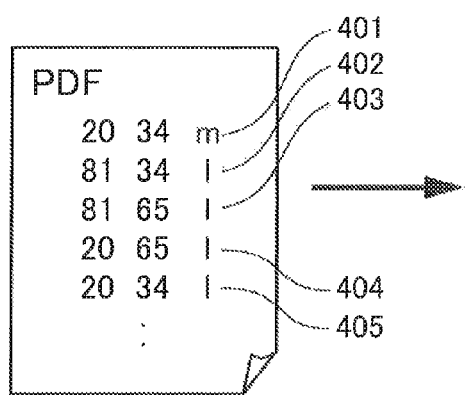
FIG. 4B
| OBJECT ID: 001 |
|---|
| OBJECT TYPE: GRAPHIC |
| UPPER LEFT COORDINATE: (20,34) — 406 |
| LOWER RIGHT COORDINATE: (81,65) — 407 |
| ⋮ |

INFORMATION PROCESSING APPARATUS, METHOD FOR CONTROLLING SAME, AND STORAGE MEDIUM ON WHICH COMPUTER PROGRAM HAS BEEN RECORDED

BACKGROUND OF THE INVENTION

1. Field of the Invention

The present invention relates to an information processing apparatus that reduces the total number of printed document pages, a Method for controlling the same, and a storage medium on which a computer program has been recorded.

2. Description of the Related Art

A technology that processes data of the original document for re-layout to save paper sheets upon printing the document has been proposed. More specifically, a technology for creating a page only having a reducible blank by reducing a margin between contents, such as line spacing, a gap between drawings, or the like has been proposed. Japanese Patent Laid-Open No. 2007-150698 discloses an image forming method that calculates the total number of original document pages, determines whether or not the total number of pages may be divisible by the number of pages to be arranged on the side of a paper sheet, and modifies the layout of original documents so as to be dividable by the number of pages to be arranged on the side of the paper sheet when it has been determined that the total number of pages is not dividable by the number of pages to be arranged on the side of the paper sheet.

SUMMARY OF THE INVENTION

The image forming method disclosed in Japanese Patent Laid-Open No. 2007-150698 reduces the number of remaining pages obtained by simply dividing the total number of pages by the number of pages to be arranged on the side of a paper sheet in order to save print sheets. Thus, according to the image forming method, when integration printing for assigning a plurality of pages to a print sheet is performed, a blank page may be generated in a part of the last print sheet. For example, assuming the case where four pages are arranged on the side of one print sheet and the layout has been modified to thereby reduce the number of pages, only three pages may be arranged on the last print sheet, resulting in generation of a page of blank.

The present invention provides an information processing apparatus that performs page reduction processing so as not to generate a blank page on a print sheet even when performing integration printing, a method for controlling the same, and a storage medium on which a computer program has been recorded.

According to an aspect of the present invention, an information processing apparatus that arranges objects included in document data in which a layout has already been set is provided that includes a print appearance acquisition unit configured to acquire print appearance information including information for integration printing for assigning a plurality of pages of the document data to each of print sheets; a group generation unit configured to generate one or a plurality of groups by grouping the plurality of objects; a page number calculation unit configured to calculate the number of pages targeted for reduction for reducing the print sheets without producing any blank page area on the print sheets, when the integration printing is performed, on the basis of the number of pages of the plurality of pages to be assigned on each of the print sheets by the integration printing and the number of pages of the document data; and a page reduction unit configured to reduce the total number of pages by moving the groups on the basis of the print appearance information and the number of pages targeted for reduction.

According to another aspect of the present invention, a method for controlling an information processing apparatus that arranges objects included in document data in which a layout has already been set is provided that includes acquiring, in a print appearance acquisition step, print appearance information including information for integration printing for assigning a plurality of pages of the document data to each of print sheets; generating, in a group generation step, one or a plurality of groups by grouping the plurality of objects; calculating, in a page number calculation step, the number of pages targeted for reduction for reducing the print sheets without producing any blank page area on the print sheets, when the integration printing is performed, on the basis of the number of pages of the plurality of pages to be assigned on each of the print sheets by the integration printing and the number of pages of the document data; and reducing, in a page reduction step, the total number of pages by moving the groups on the basis of the print appearance information and the number of pages targeted for reduction.

According to another aspect of the present invention, a storage medium storing a computer program for causing a computer to execute a method for controlling an information processing apparatus that arranges objects included in document data in which a layout has already been set is provided that includes acquiring, in a print appearance acquisition step, print appearance information including information for integration printing for assigning a plurality of pages of the document data to each of print sheets; generating, in a group generation step, one or a plurality of groups by grouping the plurality of objects; calculating, in a page number calculation step, the number of pages targeted for reduction for reducing the print sheets without producing any blank page area on the print sheets, when the integration printing is performed, on the basis of the number of pages of the plurality of pages to be assigned on each of the print sheets by the integration printing and the number of pages of the document data; and reducing, in a page reduction step, the total number of pages by moving the groups on the basis of the print appearance information and the number of pages targeted for reduction.

According to the information processing apparatus of the present invention, a blank page may be prevented from being generated in a part of the last print sheet even when integration printing for assigning a plurality of pages to each of print sheets is performed.

Further features of the present invention will become apparent from the following description of exemplary embodiments with reference to the attached drawings.

BRIEF DESCRIPTION OF THE DRAWINGS

FIG. 3A is a diagram illustrating a graphical object indicated by object information shown in FIG. 3B as an example of the present embodiment.

FIG. 3B is a diagram illustrating object information as an example of the present embodiment.

FIG. 4A is a diagram illustrating a PDF format document to be processed as an example of the document data structure.

FIG. 4B is a diagram illustrating an object corresponding to a graphical object read from the PDF format document shown in FIG. 4A as an example of the document data structure.

DESCRIPTION OF THE EMBODIMENTS

Figure 1:
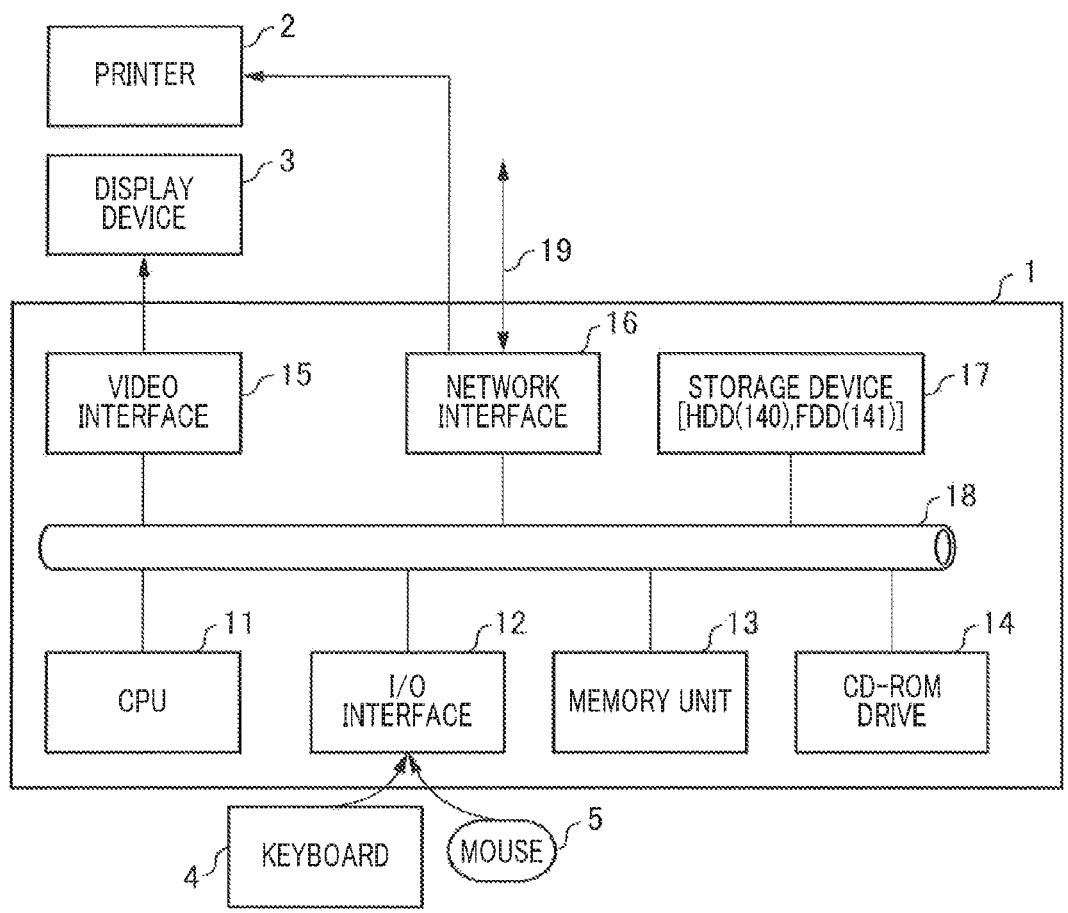
FIG. 1 is a diagram illustrating an example of the system configuration of the present embodiment.

FIG. 1 is a diagram illustrating an example of the system configuration of the present embodiment. The system shown in FIG. 1 includes a computer 1, a printer 2, and a display device 3. The computer 1 is the information processing apparatus of the present embodiment. The computer 1 executes margin reduction processing for document data in which a print layout has already been set. Margin reduction processing is processing for reducing the margin of a blank space, such as line spacing or the like, included in document data. The computer 1 executes margin reduction processing, and thus, the total number of document pages can be reduced. Also, the computer 1 transmits document data, which has undergone the aforementioned margin reduction processing, to the printer 2 to cause it to print the document data. Further, the computer 1 transmits various display data to the display device 3 to cause it to display the display data. In the present embodiment, the document data is, for example, data in PDF (Portable Document Format) or the like, which includes objects laid out on a page. The printer 2 prints the document data in accordance with the instruction from the computer 1. Also, the display device 3 displays the display data in accordance with the instruction from the computer 1.

The computer 1 includes a processor 11, I/O (Input/Output) interfaces 12 and 16, and a memory 13. The computer 1 further includes a CD-ROM (Compact Disk Read Only Memory) drive 14, a video interface 15, and a storage device 17. The processor 11, the I/O interface 12, the memory 13, the CD-ROM drive 14, the vide interface 15, the I/O interface 16, and the storage device 17 are connected to each other via a system bus 18. The processor 11 controls the computer 1 overall. The processor 11 is, for example, a CPU (Central Processing Unit). The processor 11 receives document data from an external device through the network interface 16 and the I/O interface 12 via a network 19. The processor 11 analyzes the received document data. The result of analysis of the document data includes, for example, an object list. The object list is a list of object information. The object information is information relating to an object included in document data. The processor 11 stores and manages the object list in the storage device 17. As the operation specific to the present embodiment, the processor 11 divides document data into blocks based on the analysis result of document data, and detects the column group structure of document data based on the block division result. Then, the processor 11 performs margin reduction processing for reducing the blank space between blocks included in document data in response to the detected column group structure.

The I/O interface 12 inputs the information, which has been input via a keyboard 4 and a mouse 5, to the computer 1. The I/O interface 16 mediates the transmission of document data from the computer 1 to the printer 2. Further, the I/O interface 16 communicates with external devices through a network. An exemplary network includes LAN (Local Area Network), WAN (Wide Area Network), or the like.

The memory 13 is a storage unit including RAM (Random Access Memory) and ROM (Read Only Memory). The RAM includes the working area for use in processing by the processor 11. The computer program and data for realizing a method for controlling the computer 1 are stored in the ROM in advance. The CD-ROM drive 14 is a device in which a CD-ROM, i.e., a non-volatile storage medium, is stored. The video interface 15 mediates the transmission of display data from the computer 1 to the display device 3. The storage device 17 stores, for example, document data and an object list. In the example shown in FIG. 1, the storage device 17 includes a HDD (Hard Disk Drive) and a FDD. The term "FDD" is the abbreviation for "Floppy (registered trademark) Disk Drive". The storage device 17 may include a magnetic tape drive.

Figure 2:
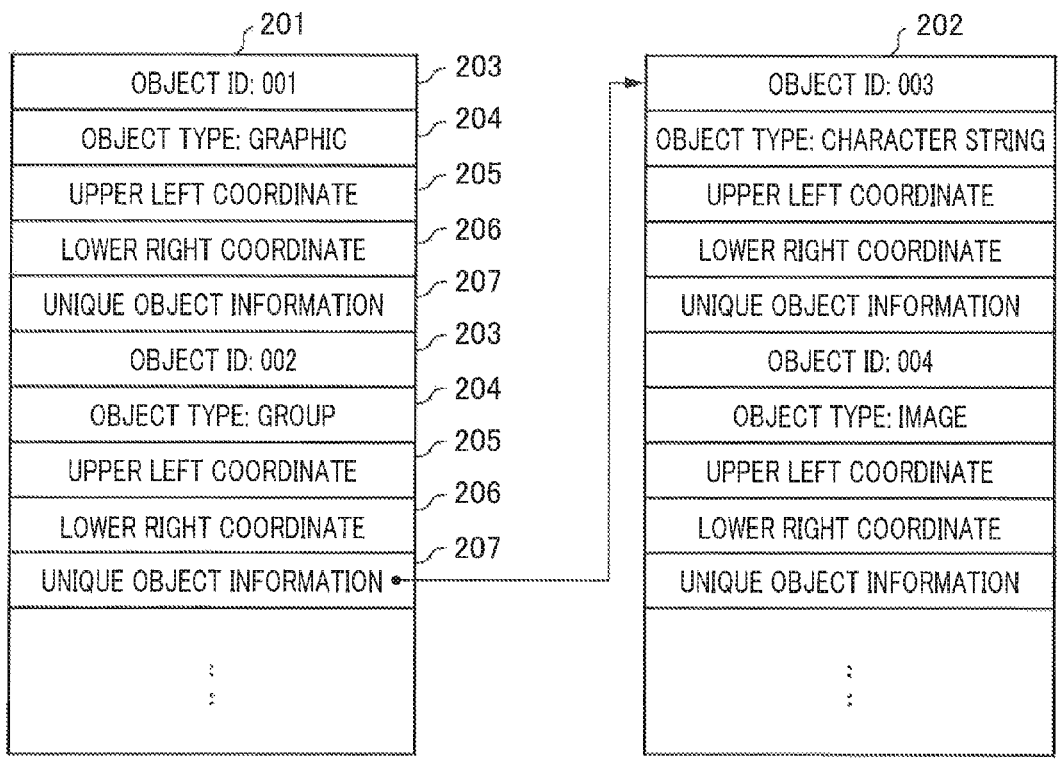
FIG. 2 is a diagram illustrating an example of the management of object information by a processor.

FIG. 2 is a diagram illustrating an example of how object information is managed by a processor. The processor 11 stores object information in an object list 201 in the form of a list structure. Each set of object information includes an object ID 203, an object type 204, an upper-left coordinate 205, a lower-right coordinate 206, and unique object information 207. The object ID 203 is an identifier for uniquely identifying an object. The object type 204 indicates the type of an object. The object type includes, for example, graphic, character string, image, group, and the like. The "group" set in the object type 204 indicates that an object corresponding to the object type 204 is subject to grouping of a plurality of objects. The term "grouping" refers to processing for combining two or more objects into a single object. The combined object is referred to as a "group". An object to be subject to grouping is any object including characters and images. Of course, a group itself is subject to grouping. In this case, object information corresponding to the group is hierarchically held. When an object is subject to grouping, the object ID in object information indicates the ID of the block. In the present embodiment, a group consisting of a single object or a group not holding therein an object may also be structurally possible.

The upper-left coordinate 205 indicates the upper-left coordinate of an object. The lower-right coordinate 206 indicates the lower-right coordinate of an object. The unique object information 207 indicates attribute information unique to an object. The unique object information 207 is information indicating a line thickness, a line type, and the like when the object type is, for example, "graphic". Also, the unique object information 207 is information indicating a font type, a size, and the like of a character when the object type is, for example, "character string". When the object type 204 in object information is set to "group", pointer information to an object list 202 is set in the unique object information 207. Object information in the object list 202 is object information about an object(s) included in the grouped object corresponding to the object information.

Each of FIGS. 3A and 3B is a diagram illustrating an example of object information. For example, object information shown in FIG. 3B indicates a rectangular graphical object shown in FIG. 3A, of which the upper-left coordinate is (20, 34), and the lower-right coordinate is (81, 65). Each of FIGS. 4A and 4B is a diagram illustrating an example of the structure of document data to be processed in the present embodiment. The computer 1 processes, for example, a PDF format document shown in FIG. 4A. The PDF format document shown in FIG. 4A indicates a graphic that is connected sequentially from the starting point (20, 34) to the point (81, 34), (81, 65), (20, 65), and (20, 34). FIG. 4B shows object information that corresponds to the graphical object read from the PDF format document shown in FIG. 4A. The object information indicates the graphical object that corresponds to the rectangular of which the upper-left coordinate is (20, 34) and the lower-right coordinate is (81, 65).

Figure 5:
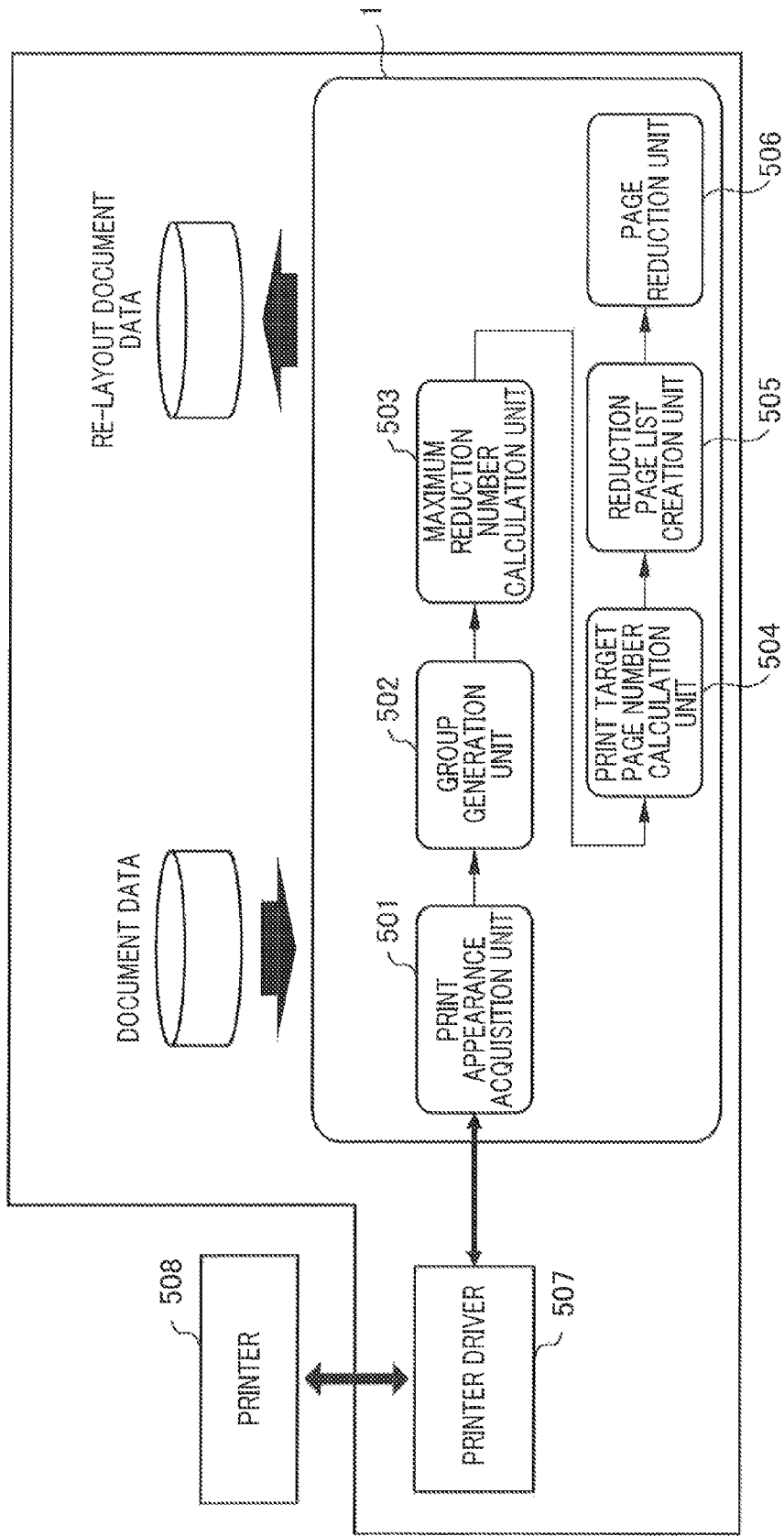
FIG. 5 is a functional block diagram illustrating an example of a computer.

FIG. 5 is a functional block diagram illustrating an example of the computer. The computer 1 includes a print appearance acquisition unit 501, a group generation unit 502, a maximum reduction number calculation unit 503, a print target page number calculation unit 504, a reduction page list creation unit 505, and a page reduction unit 506. In the present embodiment, a computer program for realizing the functions of the print appearance acquisition unit 501 to the page reduction unit 506 is stored in advance in ROM in the memory 13 shown in FIG. 1. The processor 11 reads and executes the computer program stored in ROM, whereby a method for controlling the information processing apparatus of the present embodiment is realized.

The print appearance acquisition unit 501 acquires print appearance information about document data. The group generation unit 502 combines objects positioned adjacent to one another in each page of document data into groups. The maximum reduction number calculation unit 503 calculates the maximum number of pages that can be reduced when page reduction processing is performed as much as possible. The print target page number calculation unit 504 calculates the number of pages that can be reduced for maximally reducing the number of print sheets without producing a blank page on the last page of print sheets on the basis of the number of pages capable of being reduced and print appearance information. The reduction page list creation unit 505 creates a list of pages to be reduced and determines a combination of pages to be preferentially reduced. The page reduction unit 506 reduces page(s) on the basis of a list of pages.

Figure 6:
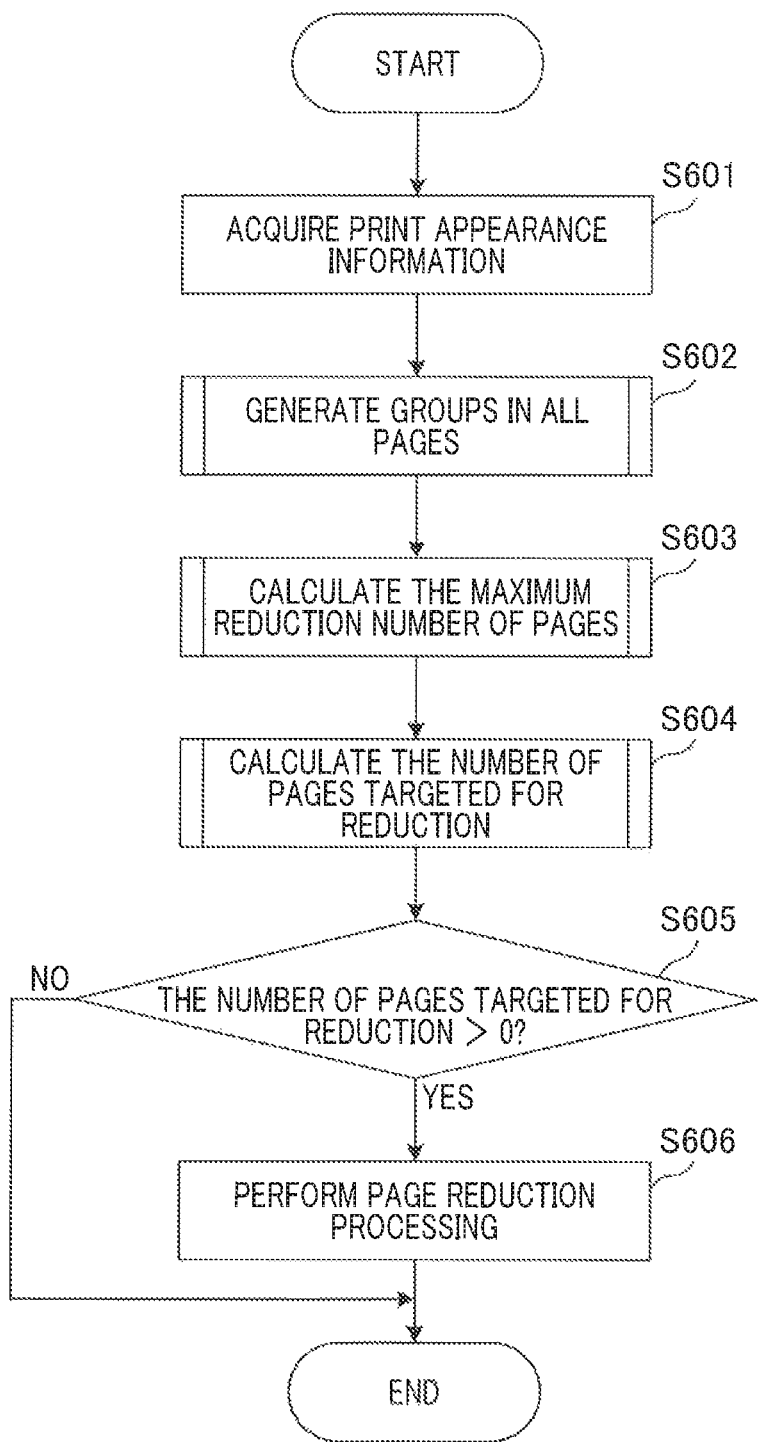
FIG. 6 is a flowchart illustrating page reduction processing according to a first embodiment.
Figure 7:
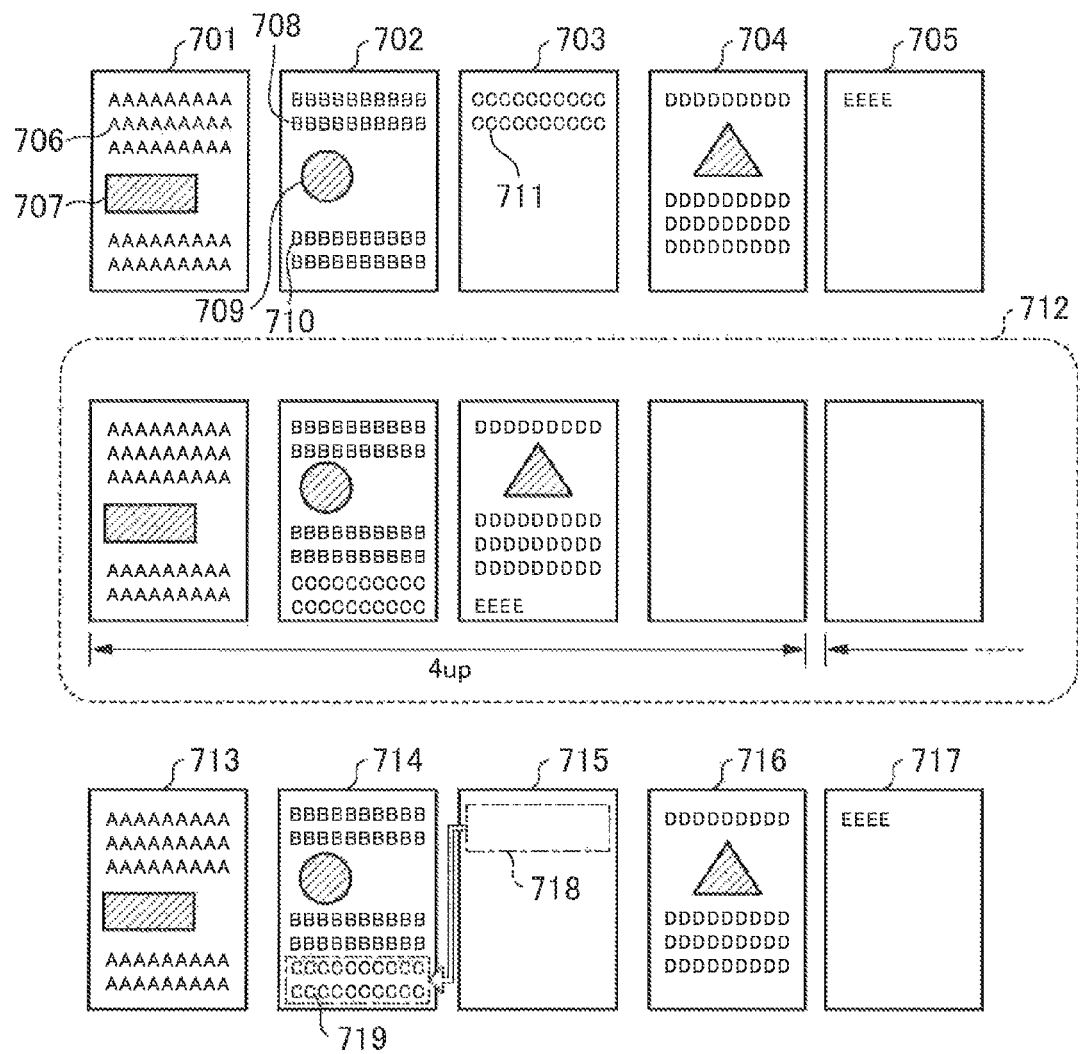
FIG. 7 is a diagram illustrating an example of re-layout according to a first embodiment.

FIG. 6 is a flowchart illustrating page reduction processing performed by the information processing apparatus according to a first embodiment of the present invention. FIG. 7 is a diagram illustrating a specific example of page reduction processing. Hereinafter, a description will be given of the flowchart shown in FIG. 6 with reference to FIG. 7. In the following description, the term "print sheet" refers to a sheet on which the document has been printed and the term "page" refers to a page of document data. The flowchart of the present embodiment is realized by reading and executing a relevant program from a memory by the CPU 11.

First, the print appearance acquisition unit 501 of the computer 1 acquires print appearance information about document data (step S601). Print appearance information is information indicating how many pages are arranged on one print sheet, including page assigning information about integration printing for assigning a plurality of pages to the side of a print sheet and information indicating whether or not double-sided printing is performed. Next, the group generation unit 502 combines objects positioned adjacent to one another in each page of document data into groups (step S602). For example, in FIG. 7, the group generation unit 502 combines character objects for each row and graphical objects both present in a page 701 into groups 706 and 707, respectively.

Next, the maximum reduction number calculation unit 503 calculates the maximum number of pages that can be reduced when page reduction processing is performed as much as possible (step S603). For example, in FIG. 7, when processing for reducing the number of pages is performed for five pages from page 701 to page 705, the maximum reduction number calculation unit 503 calculates "two pages" that can be reduced as shown in a document 712. Next, the print target page number calculation unit 504 performs the following processing on the basis of the number of pages (in other words, "two pages") capable of being reduced calculated in step S603 and print appearance information acquired in step S601. In other words, the print target page number calculation unit 504 calculates the number of pages that can be reduced for maximally reducing the number of print sheets without producing a blank page on the last page of print sheets (step S604). Here, the term "blank page" refers to a so-called fractional page, i.e., a blank page among the pages arranged on the last print sheet during integration printing. For example, in the document 712 shown in FIG. 7, even when four pages are assigned on the side of one print sheet, there are only three pages, resulting in generation of a page of blank. Thus, the print target page number calculation unit 504 judges that reducing one page is suitable instead of reducing two pages, and sets "one page" to the number of pages targeted for reduction.

Next, the page reduction unit 506 determines whether or not the number of pages targeted for reduction determined in step S604 is equal to or greater than zero (step S605). When a page targeted for reduction is present, the process shifts to step S606. The case of the number of pages targeted for reduction being zero refers to the case where the number of pages cannot be reduced or the case where the number of print sheets cannot be reduced despite the fact that the number of pages can be reduced. When the number of pages targeted for reduction is zero, the flow is ended.

Next, the page reduction unit 506 performs page reduction processing on the basis of a page list (detailed later) (step S606). Page reduction processing refers to processing for making a page 715 a blank page by moving a group 711 below groups 708 to 710 when two pages such as pages 702 and 703 are targeted. When the group 711 cannot be moved below the group 710, the page reduction unit 506 reduces a blank space (margin) present between the groups 708 to 710 and then moves the group 711. When reducing a blank space, the page reduction unit 506 is intended to leave a preset minimum necessary blank space, and also reduces a blank space between the upper end of the page and the group 708 as required.

When the number of pages cannot be reduced even by moving groups between two pages, the page reduction unit 506 moves the groups in the page 703 in the order from the top to the bottom to the page 702 as many as possible. Page reduction processing for a plurality of pages is performed by performing a group moving operation repeatedly to all pages. In this case, page reduction processing is usually performed from the leading page until the number of pages targeted for reduction is reached to thereby obtain the result of pages 713 to 717 as shown in FIG. 7. However, in some cases, page reduction processing may also be performed in the order from the tail end of the document.

Figure 8:
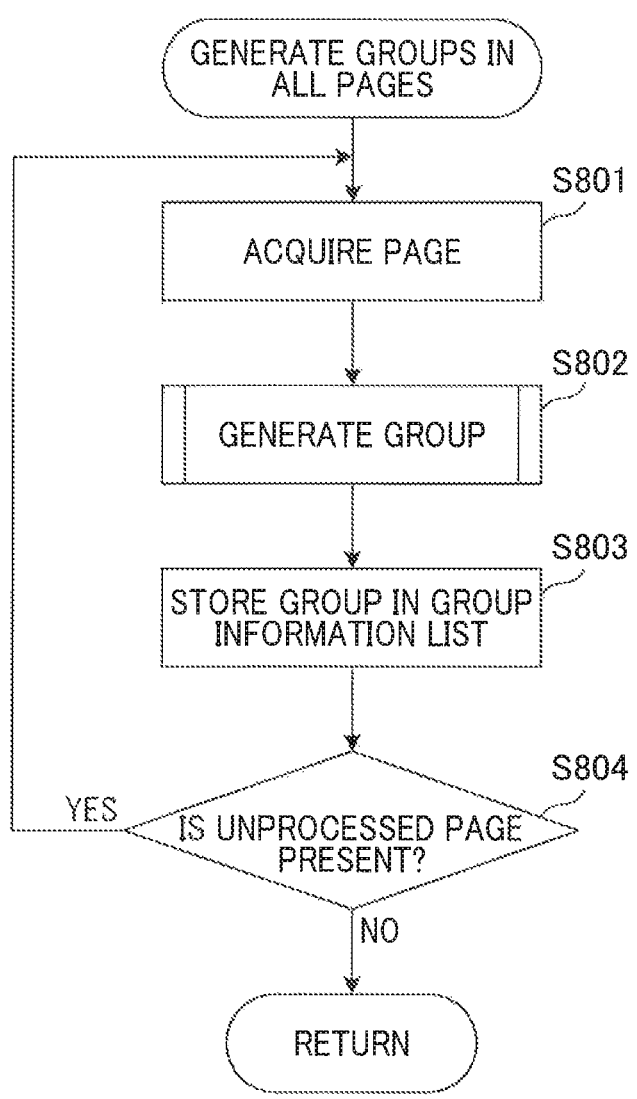
FIG. 8 is a flowchart illustrating processing for calculating the number of pages capable of being reduced.
Figure 9:
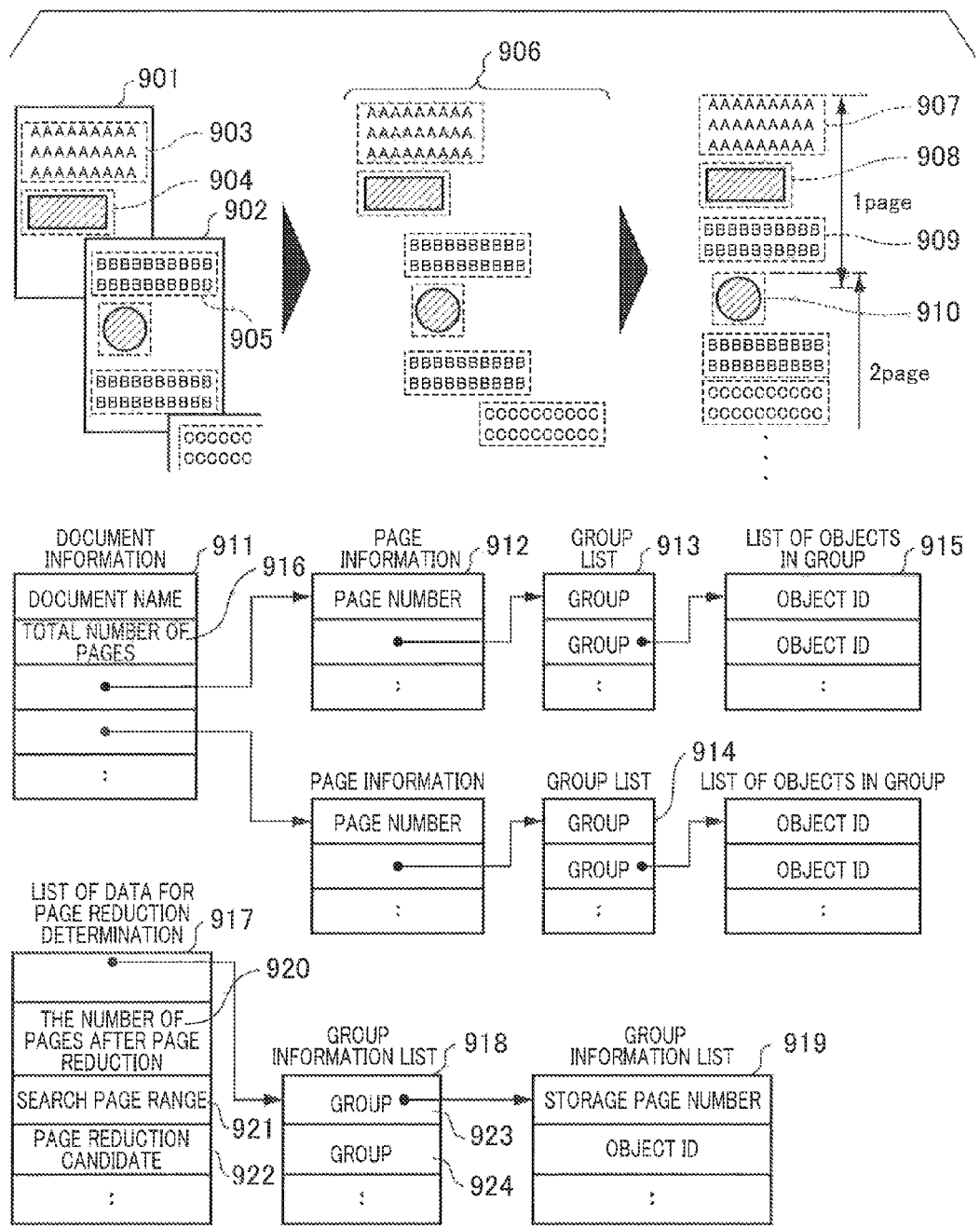
FIG. 9 is a diagram illustrating an example of how the number of pages capable of being reduced is calculated.

FIG. 8 shows group list generation processing for all pages by grouping objects positioned adjacent to one another in a page by the group generation unit 502 of the computer 1 of the first embodiment. FIG. 9 is a diagram illustrating a specific example of group list generation processing according to the first embodiment.

First, the group generation unit 502 sequentially acquires unprocessed pages (step S801). Page information is stored as a list in document information 911. The group generation unit 502 acquires page information in the order from the leading page in accordance with the document information 911. Next, the group generation unit 502 combines objects positioned adjacent to one another in a page into groups (step S802). In the example shown in FIG. 9, the group generation unit 502 combines objects in a page 901 into groups 903 and 904. At this time, the group generation unit 502 updates the content of page information 912 to thereby create a list of groups. A list of groups refers to a list of objects having the group attribute and is simply referred to as a "group" in the following description. In the list of groups 913, objects present in each group are managed as a list 915. From here, an editing operation for objects in each group may be performed and information about objects in each group may be acquired.

Next, the group generation unit 502 generates groups and creates a group information list 918 (step S803). The group information list 918 is created so as to be able to sequentially acquire groups in all pages, and has a structure in which the leading group in a list of groups 914 continues immediately after the tail end group in the list of groups 913. As shown in the schematic example of 906 in FIG. 9, groups on document are in an accessible state one after another without moving pages. A group 923 in the group information list 918 stores information such as a storage page number required when an access is made to the group, an object ID of the group, or the like as a group information list 919. Next, the group generation unit 502 determines whether or not an unprocessed page is present (step S804). When an unprocessed page is present, the process shifts to step S801, whereas when an unprocessed page is absent, the flow is ended.

Figure 10:
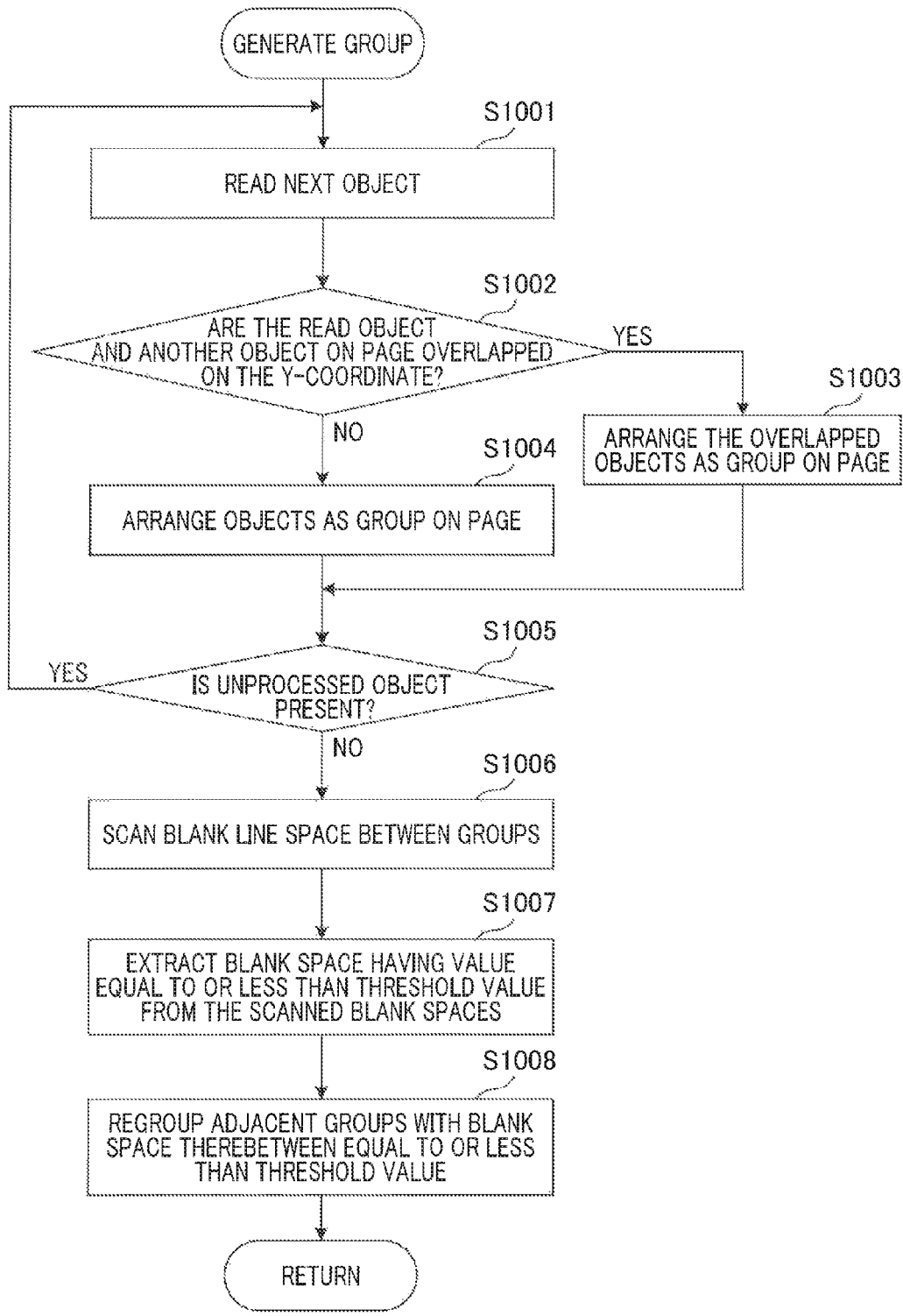
FIG. 10 is a flowchart illustrating object grouping processing.
Figure 11:
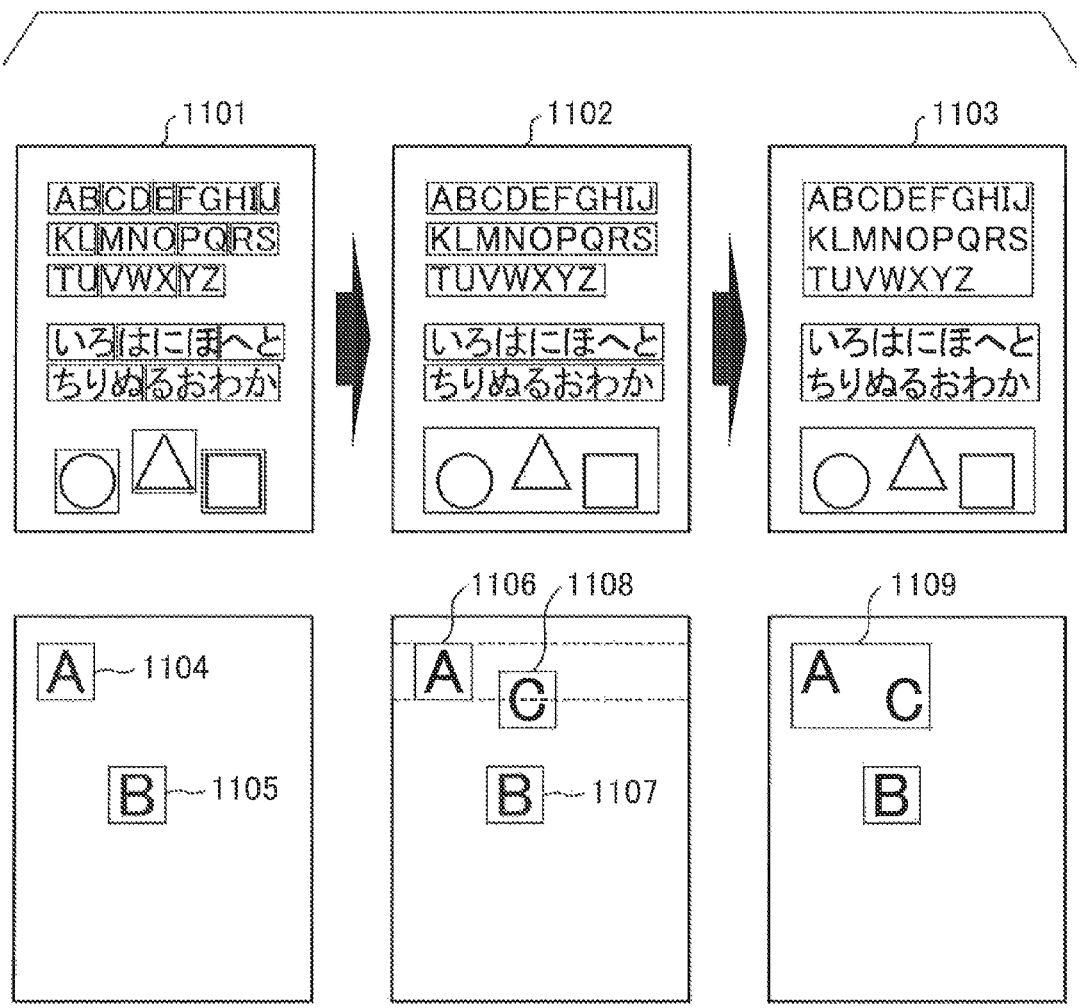
FIG. 11 is a diagram illustrating an example of object grouping processing.

FIG. 10 shows the flow of group generation processing performed by the computer 1 of the first embodiment of the present invention with respect to a document having a PDF data structure, i.e., a document of which the readout sequence is randomized. FIG. 11 is a diagram illustrating a specific example of processing for the PDF data structure according to the first embodiment. In a page 1101 shown in FIG. 11, each word in a document are segmented into separate objects and the sequence to which the objects can be acquired is also randomized. The group generation unit 502 performs processing for combining these objects in the page 1101 into groups.

First, the group generation unit 502 reads the leading object among the unprocessed objects having the PDF data structure (step S1001). Next, the group generation unit 502 determines whether or not the read object and another object which has already been read are overlapped on the Y-axis (step S1002). For example, when an object 1105 is read, the object 1105 and an object 1104 which has already been read are not overlapped on the Y-axis, and thus, the group generation unit 502 sets the objects 1104 and 1105 to separate groups (step S1003). Next, when an object 1108 is read, the object 1108 and an object 1106 are overlapped on the Y-axis, and thus, the group generation unit 502 combines the objects 1106 and 1108 overlapped to each other into one group 1109 (step S1004). When the object 1106 is a group object, the group generation unit 502 once cancels grouping, adds the object 1108 to the grouping-cancelled group object to thereby perform grouping again. Also, when the read object 1108 and a plurality of objects, e.g., the objects 1106 and 1107, are overlapped on the Y-axis on a page, the group generation unit 502 groups all of the overlapped objects 1106, 1107, and 1108.

Next, the group generation unit 502 determines whether or not an unprocessed object is present in the page (step S1005). When an unprocessed object is present, the process returns to step S1001 again, and the group generation unit 502 reads the unprocessed object. By repeating these processes, the page 1101 in which a plurality of objects is read in a randomized manner is reconfigured into a page 1102 in which a plurality of objects has been subject to grouping along the Y-axis.

When processing for all of the objects is ended, the process shifts to step S1006, and the group generation unit 502 scans all blank spaces between objects arranged on a page. Next, the group generation unit 502 extracts a blank space having a value equal to or less than a predetermined threshold value from the scanned values (step S1007). Next, the group generation unit 502 is subject to grouping for the adjacent groups with the extracted blank space therebetween equal to or less than a threshold value (step S1008). With this arrangement, the page 1102 is reconfigured into a page 1103.

Figure 12:
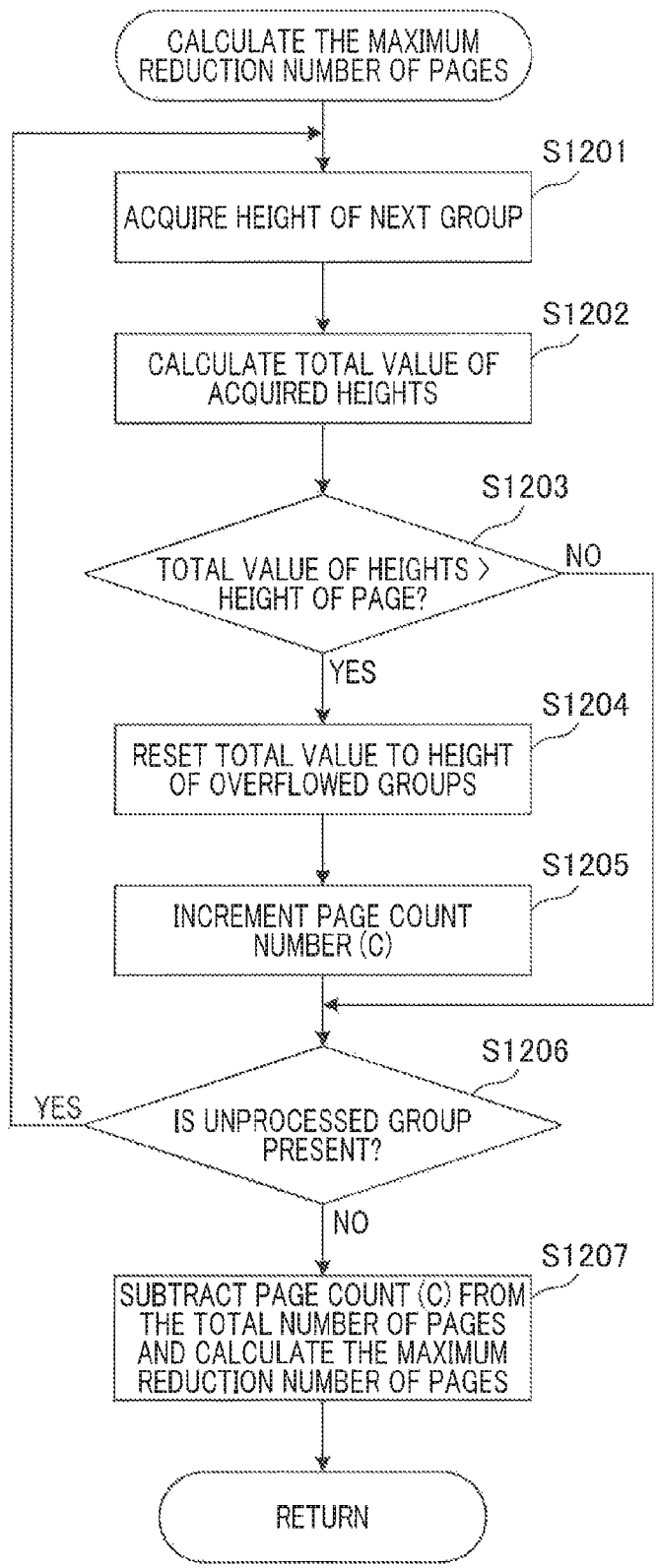
FIG. 12 is a flowchart illustrating processing for calculating the maximum reduction number of pages.

FIG. 12 is a flow illustrating processing for calculating the number of document pages (i.e., the maximum reduction number of pages) that can be maximally reduced by the maximum reduction number calculation unit 503 of the computer 1 according to the first embodiment of the present invention. In the example shown in the document 712 in FIG. 7, the maximum reduction number calculation unit 503 calculates that two pages can be reduced. A schematic description will be given of the process. The maximum reduction number calculation unit 503 determines how many pages are required for arranging all groups in the document. In other words, in the example shown in the document 712, the maximum reduction number calculation unit 503 determines that three pages are required for arranging all contents, and subtracts three pages serving as the required number of pages from five pages serving as the total number of pages to thereby calculate that two pages can be reduced. The process is specifically performed as follows.

First, the maximum reduction number calculation unit 503 acquires the next group present in document data using the group information list 918 (step S1201). Next, the maximum reduction number calculation unit 503 calculates a value obtained by adding the height of the acquired group to the total value (step S1202). More specifically, the total value of the heights of groups is zero in the initial state. When step S1201 is initially executed, the total value is the height of the initially acquired group (for example, the height of a group 907 shown in FIG. 9). When step S1201 is executed for a second time, a second group 908 is acquired, and the total value becomes a value obtained by summing the heights of two groups 907 and 908. Here, the total value is not the simple summation of the heights of groups but the summation of the heights of groups plus the total value of blank spaces required for being arranged on a page, such as a blank space between groups or the like.

The maximum reduction number calculation unit 503 determines whether or not the calculated total value exceeds the height of the page (step S1203). In the example shown in FIG. 9, when groups 907 to 910 have been acquired by the process in step S1201, the total value of the heights of groups, i.e., the total value of the heights of the groups 907 to 910, exceeds the height of one page. In this case, the process shifts to step S1204. On the other hand, when the groups acquired by the process in step S1201 are the groups 907 and 908 or the groups 907 to 909, the total value is smaller than the height of the page. Thus, the process returns to step S1206, and the maximum reduction number calculation unit 503 acquires the next group.

When the maximum reduction number calculation unit 503 acquires the group 910 in step S1204, the maximum reduction number calculation unit 503 resets the total value (the total value of the heights of the groups 907 to 910) to zero, and the total value is reset to the height of the group 910 (step S1204). Next, the maximum reduction number calculation unit 503 increments a page count value by one (step S1205). More specifically, in the example shown in FIG. 9, the maximum reduction number calculation unit 503 acquires the group 910 and performs processing in steps S1203 and S1204, and then, increments a page count value from zero to one. When the page count value is one, it means that one page is required for arranging objects from the group 907 to the group 909. Next, the maximum reduction number calculation unit 503 determines whether or not an unprocessed group is present (step S1206). When an unprocessed group is present, the process returns to step S1201, and the maximum reduction number calculation unit 503 acquires the next group. When processing for all groups has been completed, the processing flow shifts to step S1207. The maximum reduction number calculation unit 503 subtracts the count value from the total number of pages, and further subtracts one page from the subtracted number of pages to thereby calculate a maximum reduction number (step S1207).

Figure 13:
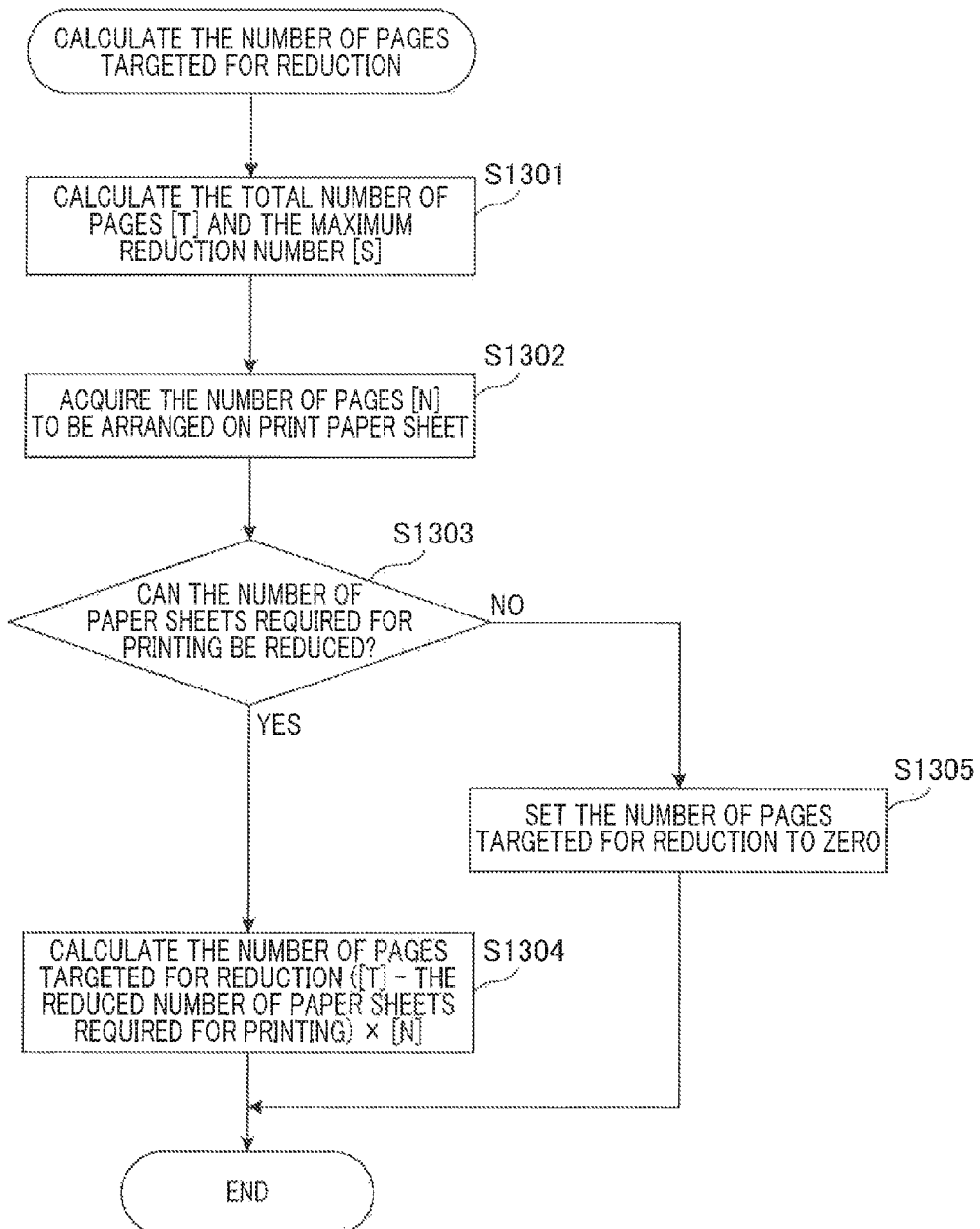
FIG. 13 is a flowchart illustrating processing for calculating the number of pages targeted for reduction.

FIG. 13 is a flowchart illustrating processing performed by the print target page number calculation unit 504 of the computer 1 according to the first embodiment of the present invention. The process is processing for calculating how many pages are properly reduced when the number of pages is reduced without producing a blank page (fractional page) by the print target page number calculation unit 504 whether or not.

First, the print target page number calculation unit 504 calculates the total number of document pages (T) and the maximum reduction number (S) (step S1301). The total number of pages (T) is acquired from the total number of pages 916 from the document information 911 (see FIG. 9), and the maximum reduction number (S) is a value calculated in the processing flow shown in FIG. 12. The print target page number calculation unit 504 calculates the number of pages (N) to be arranged on print paper sheets (step S1302). In the present first embodiment, four pages are set to be printed on a single side of a paper sheet, and thus, the value of N is four. In the case of double-sided printing, the total number of pages to be printed on opposing sides of each paper sheet is the value of N. For example, when four pages on a single side are printed on opposing sides of each paper sheet, the value of N is eight. When four pages are printed on the front side of a paper sheet and two pages are printed on the back side thereof, the value of N is six. The print target page number calculation unit 504 compares the value (T/N) obtained by dividing the total number of pages (T) by the arrangement number of pages (N) with the value ((T−S)/N) obtained by dividing the subtraction (the total number of pages (T)−maximum reduction number (S)) by the arrangement number of pages (N). The print target page number calculation unit 504 determines whether or not the number of paper sheets required for printing may be reduced on the basis of the results of comparison between the value (T/N) and the value ((T−S)/N) (step S1303). For example, when the total number of pages is six (T=6), the number of pages to be arranged on a paper sheet is four (N=4), and the reduction number of pages obtained by the process shown in FIG. 12 is one (S=1), the result of calculation of (T/N) is 1.5. On the other hand, the result of calculation of (T−S)/N is 1.25. In other words, two paper sheets are used when reduction processing is performed or not performed. Thus, it is determined that the number of paper sheets cannot be reduced. On the other hand, when T=9, N=4, and S=2, the result of calculation of (T/N) is 2.25. On the other hand, the result of calculation of (T−S)/N is 1.75. In other words, one paper sheet is used when reduction processing is performed, whereas two paper sheets are used when reduction processing is not performed. Thus, it is determined that the number of paper sheets can be reduced. When the number of paper sheets required for printing can be reduced, the print target page number calculation unit 504 sets the difference between the product of the reduced number of paper sheets required for printing and the arrangement number of pages (N) and the total number of pages as the number of pages targeted for reduction (step S1304). More specifically, in the example shown in the document 712 in FIG. 7, the value "1" obtained by subtracting the value obtained by multiplying the number of paper sheets required for printing "1" by the number of pages to be arranged on one paper sheet "4" from the total number of pages "5" is the number of pages targeted for reduction. When the number of paper sheets required for printing cannot be reduced, the number of pages targeted for reduction is set to zero (step S1305).

As described above, according to the information processing apparatus of the present embodiment, a blank page may be prevented from being generated in a part of the last print sheet even when integration printing for assigning a plurality of pages to each of print sheets is performed.

(Second Embodiment)

Figure 14:
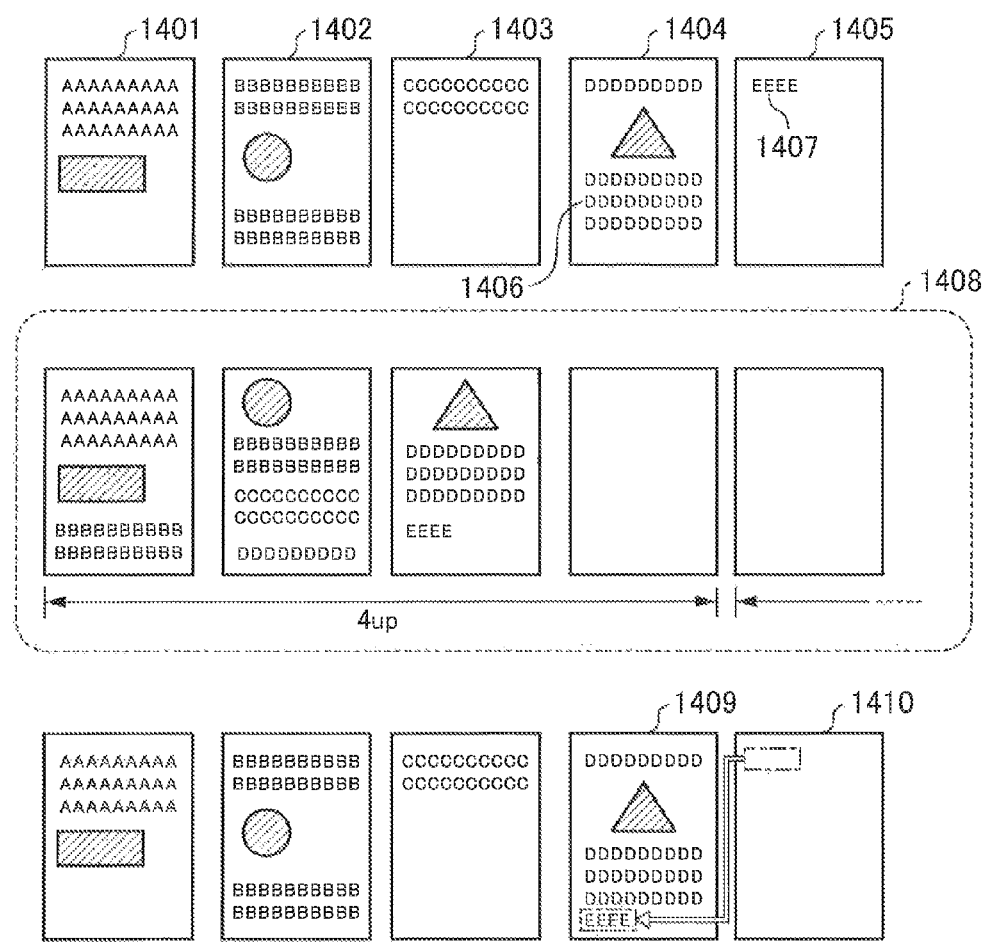
FIG. 14 is a diagram illustrating an example of page reduction processing by setting a priority.

Next, a description will be given of the information processing apparatus according to a second embodiment of the present invention. In the first embodiment, page reduction processing is sequentially performed from the leading page, resulting in an undesirable large change in the layout as shown in a document 1408 in FIG. 14. However, if page reduction processing is not performed to the limit, the change in the layout of document may be suppressed by changing the sequence of page reduction processing. For example, in the example shown in FIG. 14, when the contents in pages 1401 to 1403 are moved to reduce one page, the contents for three pages may be mixed in one page. On the other hand, when the contents in two pages 1402 and 1403 are moved to reduce one page, the change in the layout of document may be small. Furthermore, there are two types of selection: one is a method for reducing one page by bringing the pages 1402 and 1403 into combination and the other is a method for reducing one page by bringing the pages 1404 and 1405 into combination. In the second embodiment, the combination of the pages 1404 and 1405, which may cause a small change in the layout of document, is selected to be subject to page reduction processing, and thus, the result of the pages 1409 and 1410 is obtained. A description will be given below of a method for selecting a combination of pages according to the second embodiment and the influence of the selection on the layout of document.

Figure 15:
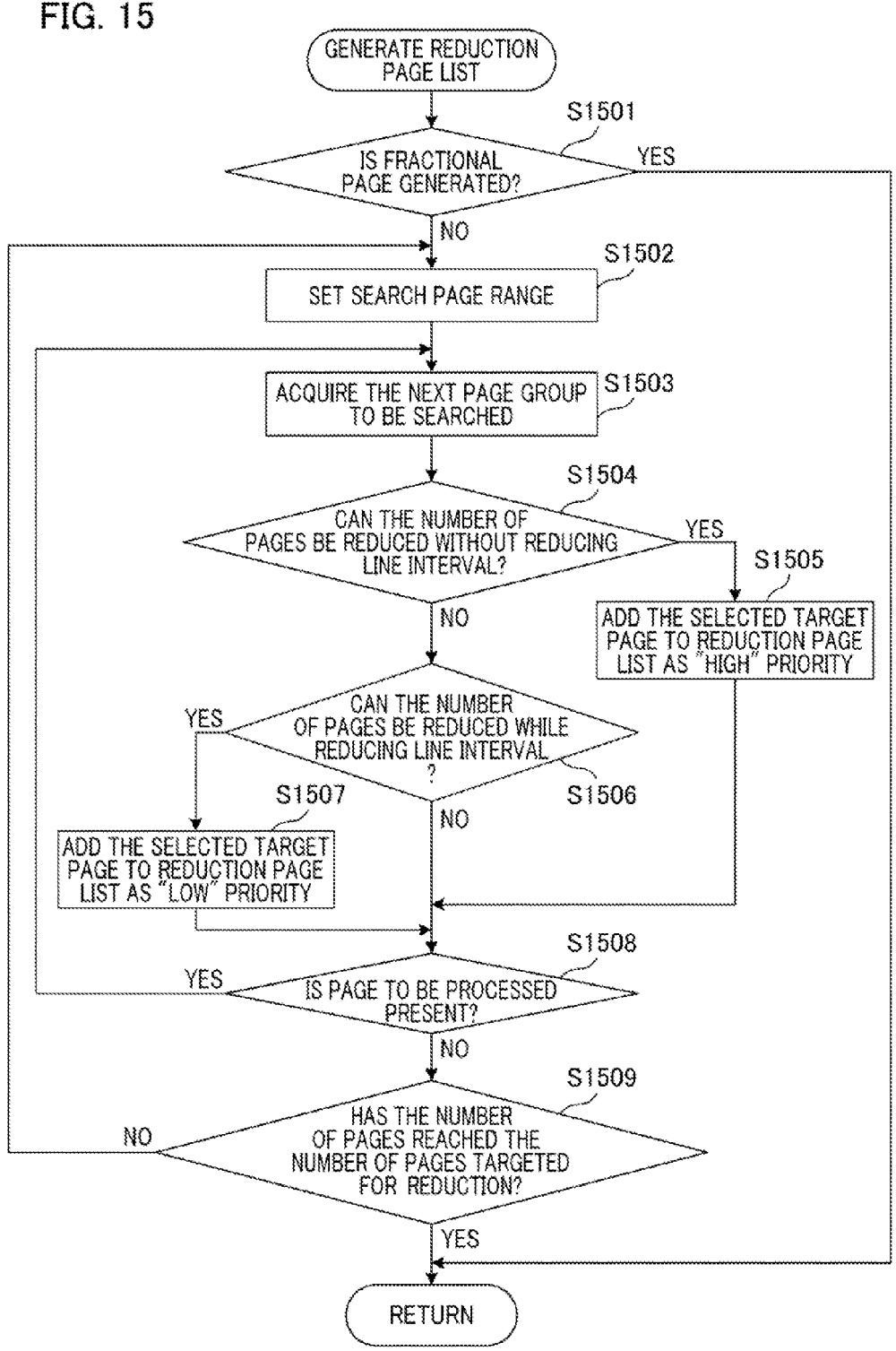
FIG. 15 is a flowchart illustrating processing for searching the candidate of pages to be reduced by setting a priority.

FIG. 15 is a flow illustrating processing performed by the reduction page list creation unit 505 of the computer 1 which is the information processing apparatus according to the second embodiment of the present invention. During processing, a list of pages to be reduced is created and a combination of pages to be preferentially reduced is also determined. The process shown in FIG. 15 is executed between steps S605 and S606 shown in FIG. 6. In the second embodiment, the flow is executed prior to step S606 in the flow shown in FIG. 6 illustrating the entire processing. In step S606 shown in FIG. 6, since a combination of pages to be preferentially reduced is created as a reduction page list, the page reduction unit 506 determines the sequence of page reduction in accordance with the list. The process will be described with reference to the specific example shown in FIG. 16.

First, the reduction page list creation unit 505 determines whether or not a blank page (fractional page) is generated, that is, whether or not a remainder obtained by dividing the result of calculation of the difference (T−S) between the total number of pages and the maximum reduction number by the arrangement number of pages (N) is zero (step S1501). When no blank page is generated, page reduction processing for reducing the margin of a blank space to the limit may be basically performed, and thus, the reduction page list creation unit 505 ends the flow without creating a priority order list. When a blank page is generated, the reduction page list creation unit 505 determines a search page range (step S1502).

During page reduction processing, it is contemplated that page reduction may be performed by fitting the contents for two pages into one page or page reduction may be performed by fitting the contents for three pages into two pages. A search page range refers to a range of pages targeted for processing for reducing one page. In general, when the number of pages included in a search page range increases, the number of pages may readily be reduced, however, the number of pages in which the layout thereof may change may also increase. Thus, the initial value for a search page range is set to two pages so as to reduce the number of pages in which the layout thereof changes. Then, a search page range is sequentially expanded on a page by page basis. A description will be given of an example of the search page range calculation method. First, the height of one paper sheet is specified. Then, it is determined whether or not the summation of the height of the blank space portion in which no object is arranged on the first page and the height of the blank space portion in which no object is arranged on the second page exceeds the height of one paper sheet. Here, when the summation of the heights of the blank space portion exceeds the height of one paper sheet, a search page range is specified as pages 1 to 2. On the other hand, when the summation of the height of the blank space portion on the first page and the height of the blank space portion on the second page does not exceed the height of one paper sheet, the height of the blank space portion on the third page is further added to the summation. Consequently, when the summation of the heights of the blank space portion exceeds the height of one paper sheet, a search page range is specified as pages 1 to 3.

The reduction page list creation unit 505 determines whether or not the next search page range is acquired, that is, whether or not next page reduction processing is performed from what page to what page (step S1503). More specifically, in the example shown in FIG. 14, when a search page range is two pages, the reduction page list creation unit 505 first acquires the pages 1401 and 1402 as a page group to be searched, and then acquires the pages 1402 and 1403 as a page group to be searched.

Figure 16:
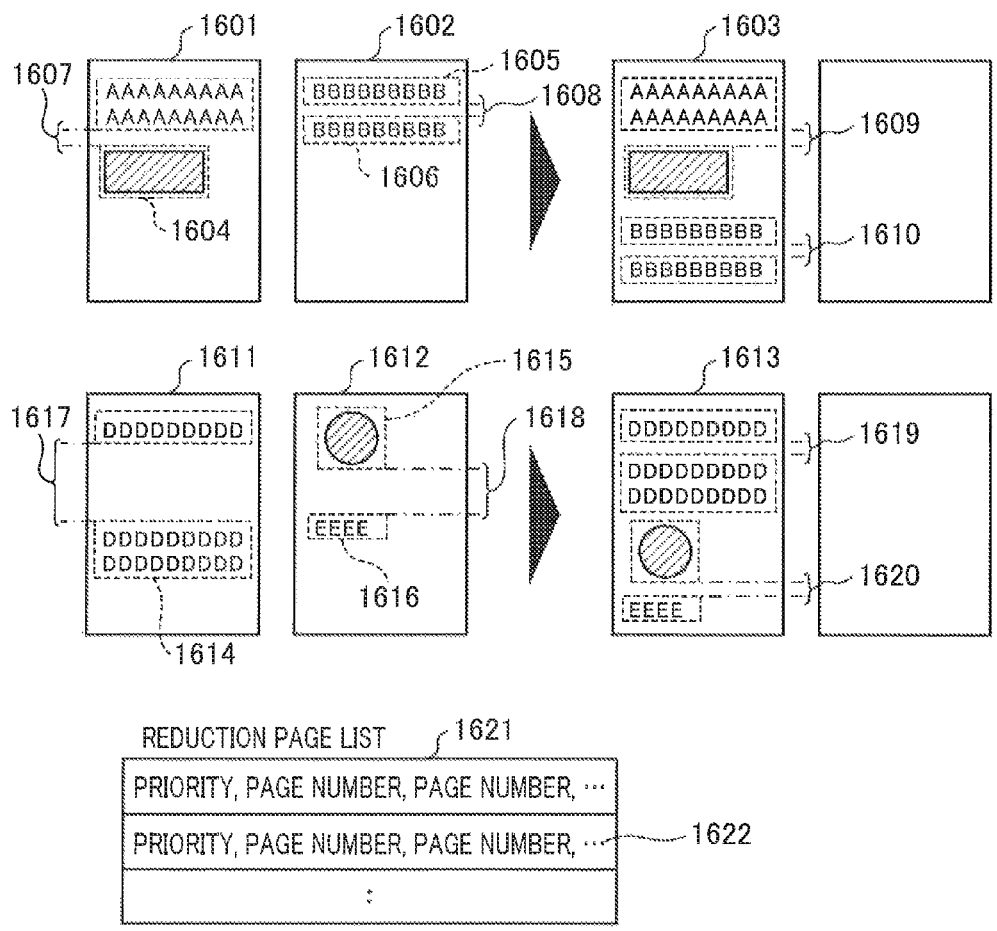
FIG. 16 is a diagram illustrating an example of processing for setting a priority by searching pages.

In steps S1504 to S1507, it is determined whether or not the number of pages can be reduced in the page group to be searched, and the priority of pages to be reduced is determined. A specific description will be given by taking an example shown in FIG. 16. FIG. 16 shows a document configured by four pages: pages 1601 and 1602 and pages 1611 to 1612. Also, a description will be given of priority determination processing for the specified two page groups in a search page range: the combination of the pages 1601 and 1602 and the other combination of the pages 1611 and 1612.

First, when page reduction processing is performed for the combination of the pages 1601 and 1602, the reduction page list creation unit 505 can determine that groups 1605 and 1606 fit a blank space below the group 1604. Thus, the groups 1605 and 1606 are moved below the group 1604 to thereby obtain a page 1603. On the other hand, when page reduction processing is performed for the combination of the pages 1611 and 1612, the groups 1615 and 1616 does not fit in a blank space below a group 1614. Thus, the reduction page list creation unit 505 performs page reduction processing for reducing blank spaces 1617 and 1618 between groups to thereby obtain a page 1613. When these two cases are in comparison, the page 1613 is obtained by reducing a blank space between contents of the original page 1611. On the other hand, the page 1603 is obtained without reducing blank spaces, and thus, the values of blank spaces 1607, 1608, 1609, and 1610 are unchanged. Therefore, the change in the layout of the content in the page 1603 is smaller than that in the page 1613. In other words, only objects are moved and no blank space is changed.

As described above, there are two types of page reduction processing: a method for performing "page reduction while reducing a blank space between lines" and the other method for performing "page reduction without reducing a blank space between lines". In the present second embodiment, the priority for the method for performing "page reduction without reducing a blank space between lines" is higher than the other method. In step S1504, the reduction page list creation unit 505 determines whether or not "page reduction without reducing a blank space between lines" can be performed. If possible, the reduction page list creation unit 505 adds a combination of target pages to an element 1622 in a reduction page list 1621 as "high" priority (step S1505). If impossible, the reduction page list creation unit 505 determines whether or not "page reduction while reducing a blank space between lines" can be performed. If page reduction can be performed, the reduction page list creation unit 505 adds a combination of target pages to an element 1622 in a reduction page list 1621 as "low" priority (step S1507).

The reduction page list creation unit 505 determines whether or not any page to be processed is further present (step S1508). When processing reaches the last page, the process advance's to step S1509. Next, the reduction page list creation unit 505 determines whether or not the number of candidate pages to be reduced in the reduction page list 1621 has reached the number of pages targeted for reduction (step S1509). When the number of pages targeted for reduction has been reached, the process is ended. When the number of pages targeted for reduction has not been reached, a search page range is expanded and processing from the leading page is restarted again. By means of such processing, the reduction page list creation unit 505 generates a list including a combination of pages to be reduced and its priority. Then, during page reduction processing in step S606, page reduction processing is sequentially executed from the page having high priority. More specifically, when the number of pages targeted for reduction is one in FIG. 16, page reduction processing for the pages 1601 and 1602 causes a smaller change in the layout of document than page reduction processing for the pages 1611 and 1612. Thus, in FIG. 16, page reduction processing for the pages 1601 and 1602 is performed, whereas page reduction processing for the pages 1611 and 1612 is not performed.

According to the information processing apparatus of the present embodiment, a blank page may be prevented from being generated in a part of the last print sheet even when integration printing for assigning a plurality of pages to each of print sheets is performed. In addition, a priority is set to the pages to be reduced and page reduction processing is sequentially performed from the page having high priority, and thus, the change in the layout of the contents after page reduction processing may be minimized.

(Other Embodiment)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-051626 filed in Mar. 9, 2011, which is hereby incorporated by reference herein in its entirety.

What is claimed is:

1. An information processing apparatus that edits objects included in document data, the information processing apparatus comprising:
   a print appearance acquisition unit configured to acquire print appearance information including information for integration printing for assigning a plurality of pages of the document data to a print sheet;
   a page number calculation unit configured to calculate the number of pages targeted for reduction for arranging the plurality of pages on the print sheet without producing any blank page area on the print sheet on the basis of the number of pages of the document data and the print appearance information; and
   a layout change processing unit configured to perform layout change processing that reduces a distance of a gap between a first object and a second object arranged in a page to a predetermined distance, until the number of pages targeted for reduction is reached,
   wherein the first object is not overlapped with the second object in the page in which the layout change processing is performed.

2. The information processing apparatus according to claim 1, further comprising a maximum reduction number calculation unit configured to calculate the maximum reduction number of pages, by which the number of the pages is capable of being maximally reduced, by moving the objects,
   wherein the page number calculation unit calculates the number of pages targeted for reduction by multiplying the number of paper sheets required for printing when the number of the pages has been maximally reduced on the basis of the maximum reduction number of pages by the number of the pages assigned to the print sheet and then subtracting the resulting product from the total number of pages.

3. The information processing apparatus according to claim 1, further comprising a reduction page list creation unit configured to create a list of the pages to be reduced and set a priority for reduction to the pages to be reduced,
   wherein the page reduction unit reduces the total number of pages on the list in accordance with the priority until the number of pages targeted for reduction is reached.

4. A method for controlling an information processing apparatus that edits objects included in document data, the method comprising:
   acquiring, in a print appearance acquisition step, print appearance information including information for integration printing for assigning a plurality of pages of the document data to a print sheet;
   calculating, in a page number calculation step, the number of pages targeted for reduction for arranging the plurality of pages on the print sheet without producing any blank page area on the print sheet and the number of pages of the document data and the print appearance information; and
   performing, in a layout change processing step, layout change processing that reduces a distance of a gap between a first object and a second object arranged in a page to a predetermined distance, until the number of pages targeted for reduction is reached,
   wherein the first object is not overlapped with the second object in the page in which the layout change processing is performed.

5. The method for controlling an information processing apparatus according to claim 4, further comprising calculating, in a maximum reduction number calculation step, the maximum reduction number of pages, by which the number of the pages is capable of being maximally reduced, by moving the objects,
   wherein, in the page number calculation step, the number of pages targeted for reduction is calculated by multiplying the number of paper sheets required for printing when the number of the pages has been maximally reduced on the basis of the maximum reduction number of pages by the number of the pages assigned to the print sheet and then subtracting the resulting product from the total number of pages.

6. The method for controlling an information processing apparatus according to claim 4, further comprising creating, in a reduction page list creation step, a list of the pages to be reduced and setting a priority for reduction to the pages to be reduced,
   wherein, in the page reduction step, the total number of pages on the list is reduced in accordance with the priority until the number of pages targeted for reduction is reached.

7. A non-transitory storage medium storing a computer program for causing a computer to execute a method for controlling an information processing apparatus that edits objects included in document data, the method comprising:
   acquiring, in a print appearance acquisition step, print appearance information including information for integration printing for assigning a plurality of pages of the document data to a print sheet;
   calculating, in a page number calculation step, the number of pages targeted for reduction for arranging the plurality of pages on the print sheet without producing any blank page area on the print sheet the number of pages of the document data and the print appearance information; and
   performing, in a layout change processing step, a layout change processing that reduces a distance of a gap between a first object and a second object arranged in a page to a predetermined distance, until the number of pages targeted for reduction is reached,
   wherein the first object is not overlapped with the second object in the page which is performed the layout change processing.

8. The non-transitory storage medium according to claim 7, storing a computer program for causing a computer to execute a method for controlling an information processing apparatus, the method further comprising calculating, in a maximum reduction number calculation step, the maximum reduction number of pages, by which the number of the pages is capable of being maximally reduced, by moving the objects,
- wherein, in the page number calculation step, the number of pages targeted for reduction is calculated by multiplying the number of paper sheets required for printing when the number of the pages has been maximally reduced on the basis of the maximum reduction number of pages by the number of the pages assigned to the print sheet and then subtracting the resulting product from the total number of pages.

9. The non-transitory storage medium according to claim 7, storing a computer program for causing a computer to execute a method for controlling an information processing apparatus, the method further comprising:
- creating, in a reduction page list creation step, a list of the pages to be reduced and setting a priority for reduction to the pages to be reduced,
- wherein, in the page reduction step, the total number of pages on the list is reduced in accordance with the priority until the number of pages targeted for reduction is reached.

* * * * *